US008122758B2

(12) United States Patent
Wang et al.

(10) Patent No.: US 8,122,758 B2
(45) Date of Patent: Feb. 28, 2012

(54) PURGE VALVE LEAK DIAGNOSTIC SYSTEMS AND METHODS

(75) Inventors: Zhong Wang, Bellevue, WA (US); Miles K. Maxey, Holly, MI (US); James D. Ethington, Swartz Creek, MI (US); Eric M. Hall, Rochester Hills, MI (US); Brian Spohn, Holly, MI (US); David Edward Prout, Linden, MI (US)

(73) Assignee: GM Global Technology Operations LLC

( * ) Notice: Subject to any disclaimer, the term of this patent is extended or adjusted under 35 U.S.C. 154(b) by 542 days.

(21) Appl. No.: 12/355,926

(22) Filed: Jan. 19, 2009

(65) Prior Publication Data

US 2009/0211340 A1 Aug. 27, 2009

Related U.S. Application Data

(60) Provisional application No. 61/030,395, filed on Feb. 21, 2008.

(51) Int. Cl.
*G01M 3/26* (2006.01)

(52) U.S. Cl. .................................. 73/49.7; 73/40; 73/47

(58) Field of Classification Search .............. 73/40–49.8
See application file for complete search history.

(56) References Cited

U.S. PATENT DOCUMENTS 5,635,630 A * 6/1997 Dawson et al. ............ 73/40.5 R
(Continued)

FOREIGN PATENT DOCUMENTS

DE 10014739 A1 10/2001

OTHER PUBLICATIONS

German Office Action for Serial No. 102009009624.8 dated Mar. 25, 2011; 3 Pages.

*Primary Examiner* — David Rogers

(57) ABSTRACT

A leak diagnostic system for a vehicle comprises a tank pressure module and a leak diagnostic module. The tank pressure module selectively outputs first and second fuel tank pressures when an engine is shut down and when engine vacuum is greater than a predetermined engine vacuum, respectively. The leak diagnostic module selectively diagnoses a leak in a fuel vapor purge valve based on the second fuel tank pressure when the first fuel tank pressure is less than a first predetermined pressure.

20 Claims, 3 Drawing Sheets

U.S. PATENT DOCUMENTS

| | | | | |
|---|---|---|---|---|
| 5,817,925 | A * | 10/1998 | Cook et al. | 73/40 |
| 6,227,037 | B1 * | 5/2001 | Kawamura et al. | 73/49.7 |
| 6,382,017 | B1 * | 5/2002 | Majkowski et al. | 73/49.7 |
| 6,487,892 | B1 * | 12/2002 | Ito et al. | 73/49.2 |
| 6,536,261 | B1 | 3/2003 | Weldon et al. | |
| 6,658,925 | B2 * | 12/2003 | Cook et al. | 73/114.39 |
| 6,666,072 | B2 * | 12/2003 | Hirano et al. | 73/49.7 |
| 6,679,111 | B2 * | 1/2004 | Shigihama et al. | 73/114.39 |
| 6,722,187 | B2 * | 4/2004 | Grieve et al. | 73/49.7 |
| 7,350,512 | B1 * | 4/2008 | Meacham et al. | 123/520 |
| 2003/0000288 | A1 * | 1/2003 | Weldon | 73/40 |
| 2003/0019286 | A1 * | 1/2003 | Wakahara et al. | 73/118.1 |
| 2003/0029226 | A1 * | 2/2003 | Kawano | 73/40.5 R |
| 2003/0056573 | A1 * | 3/2003 | Miwa et al. | 73/40.5 R |
| 2003/0079533 | A1 * | 5/2003 | Cook et al. | 73/118.2 |
| 2004/0007215 | A1 * | 1/2004 | Kawano et al. | 123/520 |
| 2004/0060343 | A1 * | 4/2004 | Amano et al. | 73/49.7 |
| 2004/0068360 | A1 * | 4/2004 | Saito et al. | 701/114 |
| 2004/0226347 | A1 * | 11/2004 | Mc Lain et al. | 73/49.2 |
| 2005/0039525 | A1 * | 2/2005 | Wakahara et al. | 73/118.1 |
| 2005/0055144 | A1 * | 3/2005 | Steckler et al. | 701/31 |
| 2005/0139197 | A1 * | 6/2005 | Ohhashi et al. | 123/520 |
| 2005/0217348 | A1 * | 10/2005 | Amano et al. | 73/49.7 |
| 2005/0262932 | A1 * | 12/2005 | Hayashi et al. | 73/118.1 |
| 2006/0032297 | A1 * | 2/2006 | Nakoji et al. | 73/118.1 |
| 2007/0113634 | A1 * | 5/2007 | Kimura | 73/118.1 |
| 2007/0199372 | A1 * | 8/2007 | Annoura | 73/118.1 |
| 2007/0214871 | A1 * | 9/2007 | Kano | 73/49.2 |
| 2008/0135025 | A1 * | 6/2008 | Mc Lain | 123/520 |
| 2009/0025458 | A1 * | 1/2009 | Ardash | 73/49.7 |
| 2009/0132147 | A1 * | 5/2009 | Jensen et al. | 701/102 |
| 2009/0133672 | A1 * | 5/2009 | Crisan | 123/518 |

* cited by examiner

PURGE VALVE LEAK DIAGNOSTIC SYSTEMS AND METHODS

CROSS-REFERENCE TO RELATED APPLICATIONS

This application claims the benefit of U.S. Provisional Application No. 61/030,395, filed on Feb. 21, 2008. The disclosure of the above application is incorporated herein by reference in its entirety.

FIELD

The present disclosure relates to fuel systems and more particularly to fuel vapor purge valves.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust a mixture of air and fuel to generate torque. The fuel supplied to the engine may be liquid fuel and/or vapor fuel. Generally, liquid fuel is contained within a fuel tank. Liquid fuel is drawn from the fuel tank and provided to the engine by one or more fuel injectors.

Various factors, such as vibration and heat, may cause the liquid fuel to vaporize within the fuel tank. Vehicles include a purge system that traps fuel vapor and provides the fuel vapor to the engine for combustion. The purge system includes a vapor canister traps and stores fuel vapor from the fuel tank. The fuel vapor is purged from the canister and provided to the engine.

The purge system also includes a purge valve and a vent valve (e.g., a diurnal valve). Operation of the engine causes a vacuum (e.g., low pressure relative to barometric pressure) to form within an intake manifold of the engine. Selective actuation (i.e., opening and closing) of the purge valve and the vent valve allows the fuel vapor to be drawn from the vapor canister into the intake manifold. In this manner, fuel vapor is provided to the engine for combustion and purged from the vapor canister.

SUMMARY

A leak diagnostic system for a vehicle comprises a tank pressure module and a leak diagnostic module. The tank pressure module selectively outputs first and second fuel tank pressures when an engine is shut down and when engine vacuum is greater than a predetermined engine vacuum, respectively. The leak diagnostic module selectively diagnoses a leak in a fuel vapor purge valve based on the second fuel tank pressure when the first fuel tank pressure is less than a first predetermined pressure.

A plug-in hybrid vehicle system comprises the leak diagnostic system of claim 1 and the fuel vapor purge valve.

In other features, the leak diagnostic module diagnoses the leak when the second fuel tank pressure is greater than a second predetermined pressure that is greater than the first predetermined pressure.

In still other features, the leak diagnostic module selectively disables diagnosing the leak based on the second fuel tank pressure when the first fuel tank pressure is greater than the first predetermined pressure.

In further features, the tank pressure module determines that the fuel vapor purge valve and a vent valve are in closed positions before outputting the first and second fuel tank pressures.

In still further features, the second predetermined pressure is based on the predetermined engine vacuum.

In other features, the tank pressure module selectively determines a pressure offset based on a difference between the first fuel tank pressure and the first predetermined pressure. The tank pressure module subtracts the pressure offset from the second fuel tank pressure before outputting the second fuel tank pressure.

In still other features, the tank pressure module determines the pressure offset when the first fuel tank pressure is less than the first predetermined pressure.

In further features, the tank pressure module outputs the first fuel tank pressure a predetermined period after the engine is shut down.

In still further features, the predetermined period based on an expected period when a vacuum forms within a fuel tank after the engine is shut down.

A leak diagnostic method for a vehicle comprises selectively outputting first and second fuel tank pressures when an engine is shut down and when engine vacuum is greater than a predetermined engine vacuum, respectively, and selectively diagnosing a leak in a fuel vapor purge valve of the vehicle based on the second fuel tank pressure when the first fuel tank pressure is less than a first predetermined pressure.

In other features, the vehicle is a plug-in hybrid vehicle.

In still other features, the selectively diagnosing the leak comprises diagnosing the leak when the second fuel tank pressure is greater than a second predetermined pressure that is greater than the first predetermined pressure.

In further features, the leak diagnostic method further comprises selectively disabling the selectively diagnosing the leak when the first fuel tank pressure is greater than the first predetermined pressure.

In still further features, the leak diagnostic method further comprises determining that the fuel vapor purge valve and a vent valve are in closed positions before the outputting the first and second fuel tank pressures.

In other features, the second predetermined pressure is based on the predetermined engine vacuum.

In still other features, the leak diagnostic method further comprises selectively determining a pressure offset based on a difference between the first fuel tank pressure and the first predetermined pressure and subtracting the pressure offset from the second fuel tank pressure before the selectively outputting the second fuel tank pressure.

In other features, the selectively determining comprises determining the pressure offset when the first fuel tank pressure is less than the first predetermined pressure.

In still other features, the selectively outputting the first fuel tank pressure comprises outputting the first fuel tank pressure a predetermined period after the engine is shut down.

In further features, the predetermined period based on an expected period when a vacuum forms within a fuel tank after the engine is shut down.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
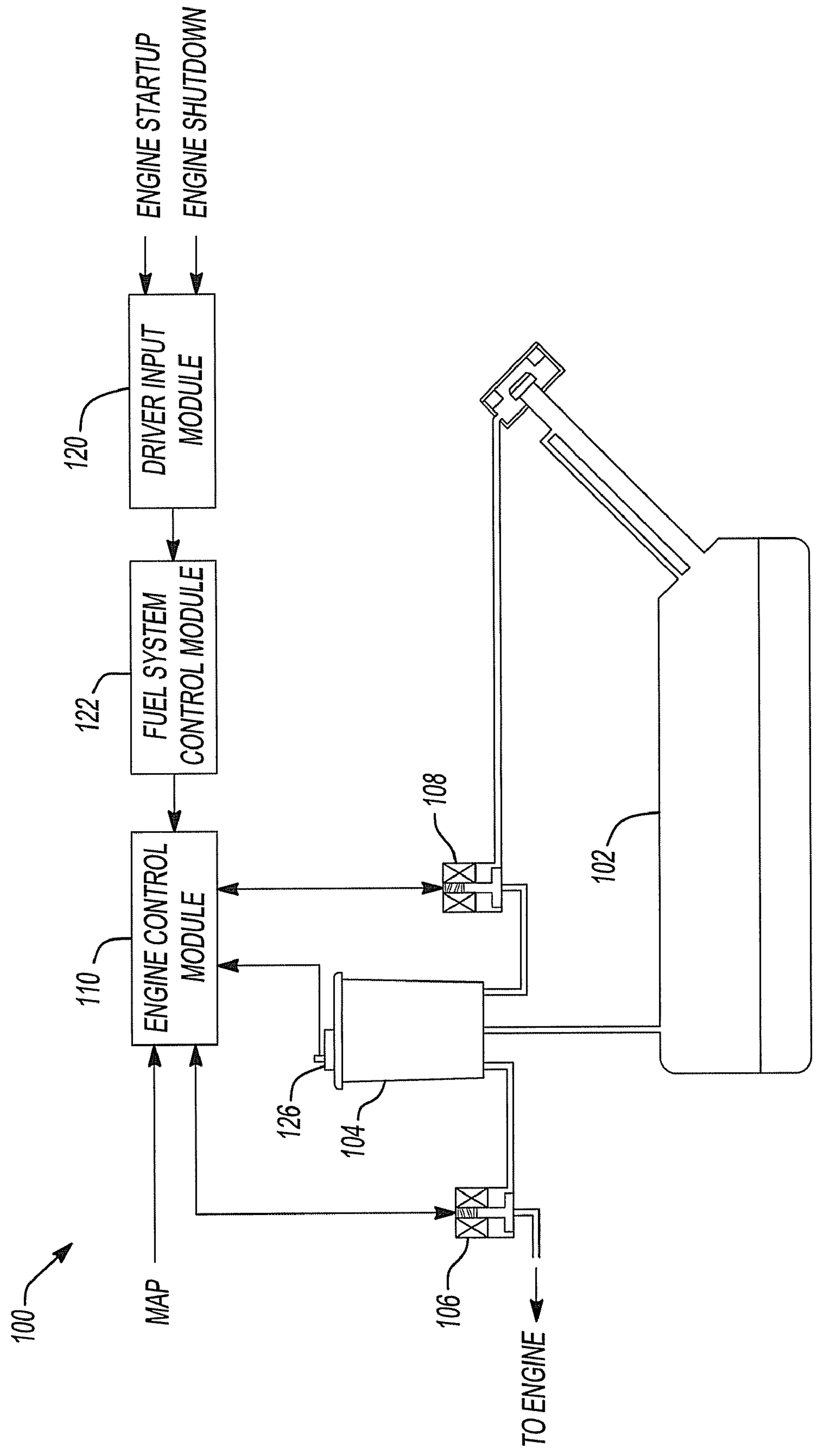
FIG. 1 is a functional block diagram of an exemplary fuel system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A leak diagnostic system and method according to the present disclosure selectively diagnoses a leak in a fuel vapor purge valve based on one or more fuel tank pressures measured when the purge valve is in a closed position. More specifically, the present disclosure relates to diagnosing a leak in the purge valve based on a first tank pressure and/or a second tank pressure.

The first tank pressure is measured while the engine is shut down, such as a predetermined period of time after the engine is shut down. As the purge valve is maintained in the closed position while the engine is shut down, a vacuum should naturally form within the fuel tank. Accordingly, a purge valve leak may be present when the first tank pressure does not reflect the presence of such a vacuum.

The second tank pressure is measured while the engine is running. More specifically, the second tank pressure is measured while the engine vacuum is greater than a predetermined engine vacuum. As the purge valve is also maintained in the closed position when the second tank pressure is measured, the engine vacuum should not be reflected in the second tank pressure. Accordingly, a leak may also be present in the purge valve when the second tank pressure reflects the engine vacuum.

Referring now to FIG. 1, a functional block diagram of an exemplary fuel system 100 is presented. Generally, a vehicle includes an internal combustion engine (not shown) that generates torque. For example only, the engine may be a gasoline-type engine, a diesel-type engine, and/or any other suitable type of engine. The engine combusts a mixture of air and fuel within one or more cylinders of the engine to generate torque.

In some vehicles, torque generated by the engine may be used to propel the vehicle. In such vehicles, torque output by the engine is transferred to a transmission, which may then transfer torque to one or more wheels of the vehicle. In other vehicles, such as plug-in hybrid vehicles, torque output by the engine is not transferred to the transmission. Instead, torque output by the engine is converted into electrical energy by, for example, a generator or a belt alternator starter (BAS). The electrical energy may be then provided to an electric motor and/or an energy storage device. The plug-in hybrid vehicle may also receive electrical energy from an alternating current (AC) power source, such as a standard wall outlet. The electric motor uses electrical energy to generate torque to propel the vehicle.

The fuel system 100 supplies fuel to an engine, such as an engine of a plug-in hybrid vehicle or any other suitable vehicle. More specifically, the fuel system 100 supplies liquid fuel and fuel vapor to the engine. While the operation of the fuel system 100 will be discussed as it relates to plug-in hybrid vehicles, the principles of the present disclosure are applicable to other vehicles having an internal combustion engine.

The fuel system 100 includes a fuel tank 102 that contains liquid fuel. Some conditions, such as heat, vibration, and/or radiation, may cause liquid fuel contained within the fuel tank 102 to vaporize. A canister 104 traps and stores vaporized fuel (i.e., fuel vapor). For example only, the canister 104 may include one or more substances, such as a charcoal substance, which store fuel vapor.

Operation of the engine creates a vacuum within an intake manifold of the engine. A purge valve 106 and a vent valve 108 may be selectively operated to draw fuel vapor from the canister 104 to the intake manifold for combustion. Operation of the purge valve 106 and the vent valve 108 may be coordinated to purge fuel vapor from the canister 104. An engine control module (ECM) 110 controls the operation of the purge valve 106 and the vent valve 108.

At a given time, the purge valve 106 and the vent valve 108 may each be in one of two positions: an open position and a closed position. For example, the ECM 110 may allow ambient air into the canister 104 by commanding the vent valve 108 to the open position. When the vent valve 108 is in the open position, the ECM 110 may command the purge valve 106 to the open position to purge fuel vapor from the canister 104 to the intake manifold. The ECM 110 also controls the rate at which fuel vapor is purged from the canister 104 (i.e., a purge rate) by adjusting how long the purge valve 106 is in the open position during a given period of time (i.e., a purge valve duty cycle).

The vacuum within the intake manifold draws fuel vapor from the canister 104 to the intake manifold via the purge valve 106. The purge rate may be determined based on the duty cycle of the purge valve 106 and the amount of fuel vapor within the canister 104. Coincidentally, air at ambient (i.e., barometric) pressure is drawn into the canister 104 via the vent valve 108.

A driver input module 120 receives various commands from a driver, such as commands regarding the operational status of the engine. For example, the driver input module 120 may receive an engine startup command and an engine shutdown command. The driver may command engine startup or shutdown by, for example, turning a key or pressing a button. The driver input module 120 transmits the driver's commands to a fuel system control module 122, which may then transmit the driver's commands to the ECM 110.

The ECM 110 starts the engine when the engine startup command is received. For example, the ECM 110 may activate a starter or other device to start the engine. The ECM 110 commands the vent valve 108 to the open position and controls the duty cycle of the purge valve 106 after the engine is started (i.e., when the engine is ON).

The ECM 110 also shuts down the engine when the engine shutdown command is received. For example, the ECM 110 eliminates combustion to shut down the engine. When the engine is shut down, the ECM 110 commands both the purge valve 106 and the vent valve 108 to their respective closed positions. Accordingly, both the purge valve 106 and the vent valve 108 are maintained in their respective closed positions when the engine is not operational (i.e., OFF).

A vacuum naturally forms within the fuel tank 102 after the engine is shut down. This vacuum may be attributable to heating and subsequent cooling of gas (e.g., air and/or fuel vapor) present in the fuel tank 102 after the engine is shut down.

The ECM 110 may receive other signals and may perform various functions based on the received signals. For example only, the ECM 110 may receive a tank pressure signal and an engine vacuum signal. A tank pressure sensor 126 measures gas pressure within the fuel tank 102 (i.e., a tank pressure) and generates the tank pressure signal accordingly. While the tank pressure sensor 126 is shown as being located within the canister 104, the tank pressure sensor 126 may be located in any suitable location, such as within the fuel tank 102. The engine vacuum signal may be generated based on, for example, a manifold absolute pressure (MAP) measured by a MAP sensor (not shown). For example, the engine vacuum may be the difference between the barometric pressure and the MAP.

Figure 2:
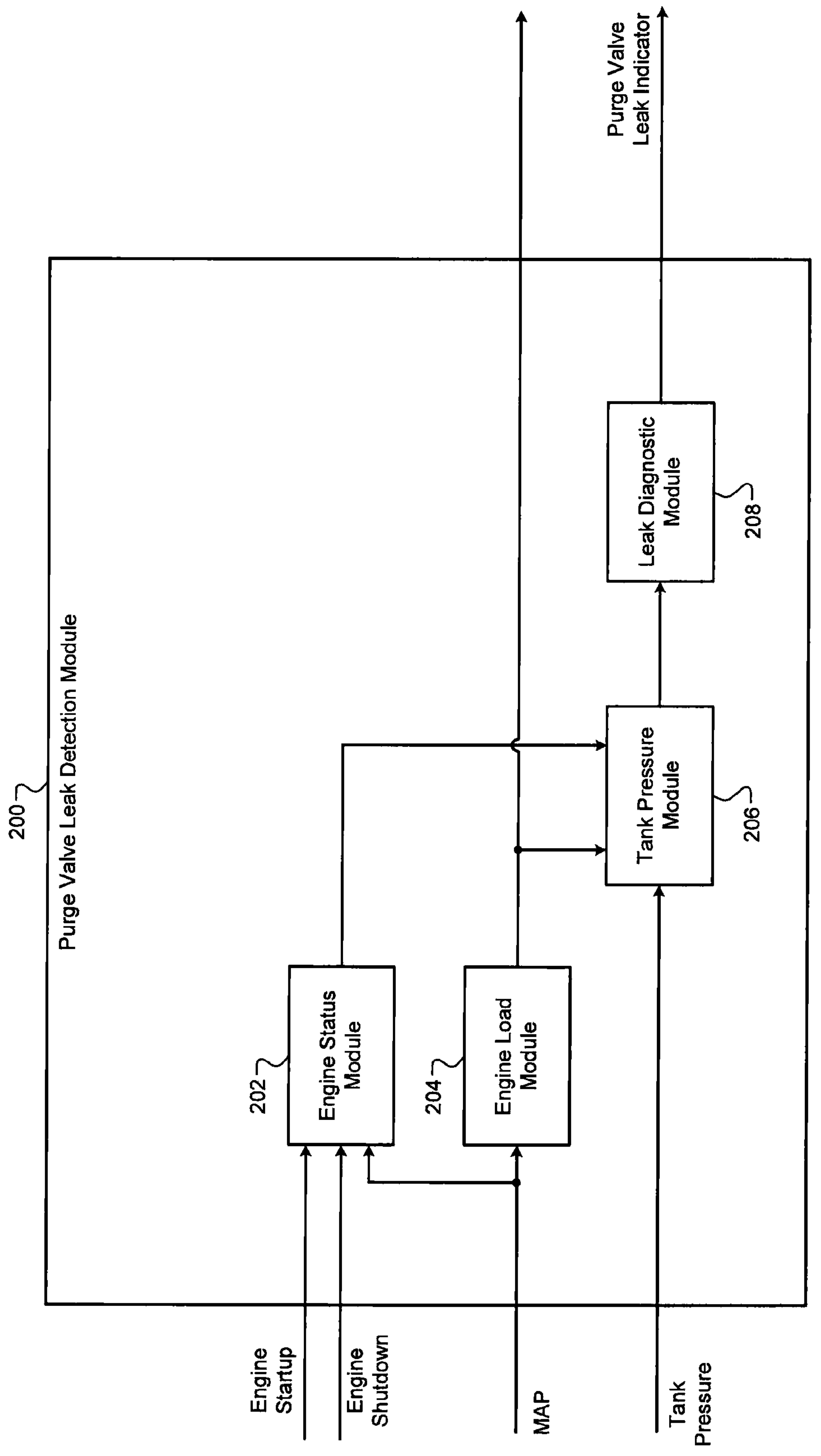
FIG. 2 is a functional block diagram of an exemplary implementation of a purge valve leak detection module according to the principles of the present disclosure.

The ECM 110 includes a purge valve leak detection module 200 (as shown in FIG. 2) that selectively diagnoses a leak in the purge valve 106. The purge valve leak detection module 200 according to the present application selectively diagnoses a leak in the purge valve 106 based on a first tank pressure that is measured while the engine is shut down and/or a second tank pressure that is measured while the engine is operational. Leak detection may be used, for example, to ensure that fuel vapor does not escape when the purge valve 106 is closed, such as when the engine is shut down.

While the purge valve leak detection module 200 is discussed as being located within the ECM 110, the purge valve leak detection module 200 may be located in any suitable location. For example only, the purge valve leak detection module 200 may be located within the fuel system control module 122, another module within a plug-in hybrid vehicle system, and/or any other module in any other type of vehicle system.

Referring now to FIG. 2, a functional block diagram of an exemplary implementation of the purge valve leak detection module 200 is presented. The purge valve leak detection module 200 includes an engine status module 202, an engine load module 204, a tank pressure module 206, and a leak diagnostic module 208. The engine status module 202 determines the operational status of the engine and generates an engine status indicator accordingly. More specifically, the engine status module 202 may determine whether the engine is operational or not operational.

The engine status module 202 may determine the operational status of the engine based on the driver's commands and/or other engine parameters, such as the output speed of the engine (RPM) and/or the engine vacuum. The engine status module 202 may determine that the engine is operational after the engine startup command is received and/or the engine vacuum is greater than a predetermined pressure, such as 0.0 inches water. Similarly, the engine status module 202 may determine that the engine is not operational after the engine shutdown command is received and/or the engine vacuum is approximately equal to 0.0 inches water.

The engine load module 204 generates an engine load indicator (signal) based on the engine vacuum. More specifically, the engine load module 204 generates the engine load indicator based on a comparison of the engine vacuum with a maximum possible engine vacuum ($EV_{MAX}$). The engine load indicator indicates whether specified engine load conditions are satisfied. For example only, the engine load conditions may be satisfied when:

$$\text{Engine Vacuum} > 80\% \ (EV_{MAX}),$$

where $EV_{MAX}$ is the maximum possible engine vacuum. For example only, the $EV_{MAX}$ may be 100.0 kPa. In other implementations, the engine load conditions may be satisfied when the engine vacuum is greater than 50% of an $EV_{MAX}$ of 80.0 kPa.

The engine load module 204 may also require that the engine load conditions be satisfied for a predetermined period of time. Accordingly, the engine load conditions may be satisfied when the engine vacuum is greater than a predetermined percentage of the $EV_{MAX}$ for at least the predetermined period of time. For example only, the predetermined period of time may be 10.0 seconds. In other implementations, the predetermined period of time may be 60.0 seconds.

As stated above, the ECM 110 commands the vent valve 108 to its open position and selectively actuates the purge valve 106 when the engine is operational. When the engine load conditions have been satisfied, as indicated by the engine load indicator, the ECM 110 commands both the purge valve 106 and the vent valve 108 to their respective closed positions.

The tank pressure module 206 receives the tank pressure signal from the tank pressure sensor 126 and selectively outputs tank pressures. More specifically, the tank pressure module 206 selectively outputs tank pressures based on the operational status of the engine and the engine load conditions.

The tank pressure module 206 outputs a first tank pressure (i.e., vacuum) while the engine is not operational. The tank pressure module 206 may output the first tank pressure, for example, at a time when the engine is shut down, a predetermined period after engine shutdown, or before engine startup when a key is inserted into an ignition. For example only, the tank pressure module 206 may output the first tank pressure 20.0-30.0 minutes after the engine is shut down.

The closing of the vent valve 108 and the purge valve 106 after engine shutdown coupled with heating and then cooling of the gas within the fuel tank 102 causes a natural vacuum to form within the fuel tank 102. In various implementations, the output of the first tank pressure may be timed relative to the time at which the natural vacuum is likely the greatest.

The tank pressure module 206 also outputs a second tank pressure (i.e., vacuum). The second tank pressure, unlike the first tank pressure, is output at a time when the engine is operational. More specifically, the tank pressure module 206 may output the second tank pressure when the engine load conditions are satisfied. The tank pressure module 206 may also ensure that both the vent valve 108 and the purge valve 106 are in their respective closed positions before outputting the second tank pressure.

The leak diagnostic module 208 selectively diagnoses a leak in the purge valve 106 based on the first tank pressure and/or the second tank pressure. More specifically, the leak diagnostic module 208 selectively diagnoses the presence of a leak in the purge valve 106 based on a comparison of the first tank pressure with a first predetermined pressure (i.e., vacuum). For example only, the first predetermined pressure may be determined based on the natural vacuum and may be equal to 2.5 inches water.

As the purge valve 106 and the vent valve 108 are in their respective closed positions when the engine is shut down, vacuum that forms should be retained, and the first tank pressure should reflect this vacuum. Accordingly, a leak is not likely present when the first tank pressure is greater than the first predetermined pressure.

The leak diagnostic module 208 may set an offset value equal to the first tank pressure if the first tank pressure is less than the first predetermined pressure. The offset value may represent an amount of measurement error that may be attributable to the tank pressure sensor 126. This offset value may be used in conjunction with leak diagnostics involving the second tank pressure, as discussed further below.

If the first tank pressure is less than the first predetermined pressure, the leak diagnostic module 208 also diagnoses whether a leak is present in the purge valve 106 based on a comparison of the second tank pressure with a second predetermined pressure (i.e., vacuum). For example only, the second predetermined pressure may be determined based on the engine vacuum when the engine load conditions are satisfied. In various implementations, the second predetermined pressure may be equal to 12.0 inches water.

As the purge valve 106 and the vent valve 108 are closed when the second tank pressure is output, vacuum that is present in the intake manifold should be isolated. Therefore, the second tank pressure should not reflect the manifold vacuum. Accordingly, the leak diagnostic module 208 may diagnose a leak in the purge valve 106 when the second tank pressure is greater than the second predetermined pressure. The leak diagnostic module 208 generates a purge valve leak indicator (signal) based on the diagnosis.

The leak diagnostic module 208 may also subtract the offset value from the second tank pressure before comparing the second tank pressure with the second predetermined pressure. Such a subtraction may be implemented to prevent the leak diagnostic module 208 from incorrectly diagnosing a leak in the purge valve 106 that may instead be attributable to measurement error of the tank pressure sensor 126.

The leak diagnostic module 208 may transmit the purge valve leak indicator to the ECM 110, which may take remedial action when a leak has been diagnosed in the purge valve 106. For example only, the ECM 110 may illuminate a "check engine light" and/or set a flag in memory when a leak has been diagnosed.

Figure 3:
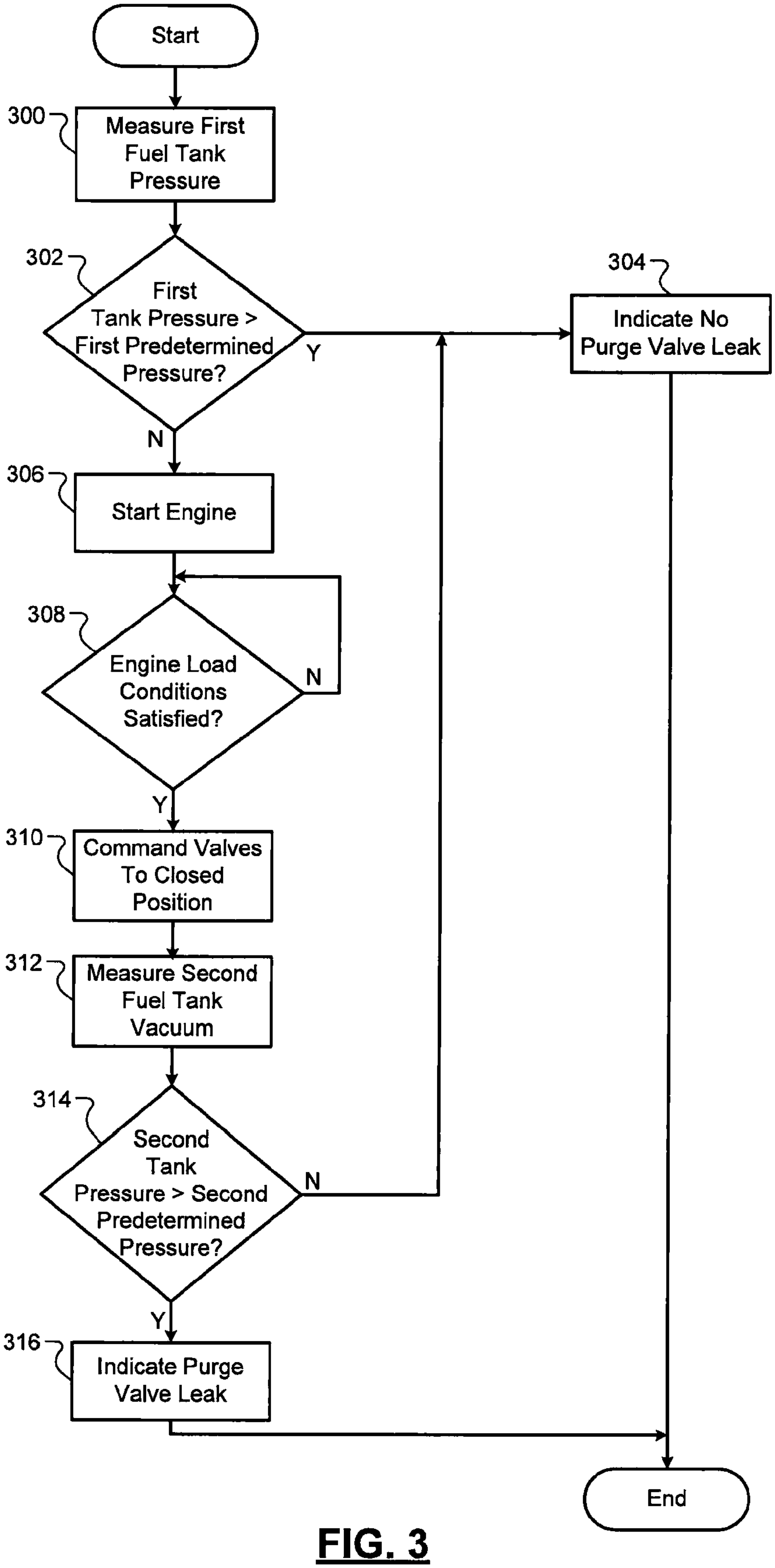
FIG. 3 is a flowchart depicting exemplary steps performed by the purge valve leak detection module according to the principles of the present disclosure.

Referring now to FIG. 3, a flowchart depicting exemplary steps performed by the purge valve leak detection module 200 is presented. Control begins in step 300 where control measures the first tank pressure. The engine is not operational and both the purge valve 106 and the vent valve 108 are in their respective closed positions when the first tank pressure is measured.

Control continues in step 302 where control determines whether the first tank pressure is greater than the first predetermined pressure. If true, control transfers to step 304; otherwise, control continues to step 306. For example only, the first predetermined pressure may be equal to 2.5 inches water. In step 304, control indicates that the purge valve 106 does not have a leak, and control ends.

In step 306 (if the first tank pressure is less than the first predetermined pressure), control commands startup of the engine. The vent valve 108 is then opened, and the purge valve 106 is selectively actuated. Control continues in step 308 where control determines whether the engine load conditions are satisfied. If true, control continues to step 310; otherwise, control remains in step 308. The engine load conditions may be satisfied when the engine vacuum is greater than a predetermined percentage of the $EV_{MAX}$ for a predetermined period of time. For example only, the predetermined percentage may be 80%, and the predetermined period of time may be 10.0 seconds. In other implementations, the predetermined percentage may be 50% and the predetermined period may be 60.0 seconds.

In step 310, control commands (i.e., maintains) both the purge valve 106 and the vent valve 108 to their respective closed positions. Control then continues in step 312 where control measures the second tank pressure. In step 314, control determines whether the second tank pressure is greater than the second predetermined pressure. If true, control continues to step 316; otherwise, control returns to step 304. For example only, the second predetermined pressure may be equal to 12.0 inches water. In step 316, control diagnoses a leak in the purge valve 106 and control indicates a leak is present in the purge valve 106. Control then ends.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A leak diagnostic system for a vehicle, comprising:

a tank pressure module that selectively outputs first and second fuel tank pressures when an engine is shut down and when engine vacuum is greater than a predetermined engine vacuum, respectively; and a leak diagnostic module that selectively diagnoses a leak in a fuel vapor purge valve based on said second fuel tank pressure when said first fuel tank pressure is less than a first predetermined pressure.

2. The leak diagnostic system of claim 1 wherein said leak diagnostic module selectively disables diagnosing said leak based on said second fuel tank pressure when said first fuel tank pressure is greater than said first predetermined pressure.

3. The leak diagnostic system of claim 1 wherein said tank pressure module determines that said fuel vapor purge valve and a vent valve are in closed positions before outputting said first and second fuel tank pressures.

4. The leak diagnostic system of claim 1 wherein said leak diagnostic module diagnoses said leak when said second fuel tank pressure is greater than a second predetermined pressure that is greater than said first predetermined pressure.

5. The leak diagnostic system of claim 4 wherein said second predetermined pressure is based on said predetermined engine vacuum.

6. The leak diagnostic system of claim 1 wherein said tank pressure module selectively determines a pressure offset based on a difference between said first fuel tank pressure and said first predetermined pressure, and wherein said tank pressure module subtracts said pressure offset from said second fuel tank pressure before outputting said second fuel tank pressure.

7. The leak diagnostic system of claim 6 wherein said tank pressure module determines said pressure offset when said first fuel tank pressure is less than said first predetermined pressure.

8. The leak diagnostic system of claim 1 wherein said tank pressure module outputs said first fuel tank pressure a predetermined period after said engine is shut down.

9. The leak diagnostic system of claim 8 wherein said predetermined period based on an expected period when a vacuum forms within a fuel tank after said engine is shut down.

10. A plug-in hybrid vehicle system comprising:

the leak diagnostic system of claim 1; and the fuel vapor purge valve.

11. A leak diagnostic method for a vehicle, comprising:

selectively outputting first and second fuel tank pressures when an engine is shut down and when engine vacuum is greater than a predetermined engine vacuum, respectively; and selectively diagnosing a leak in a fuel vapor purge valve of said vehicle based on said second fuel tank pressure when said first fuel tank pressure is less than a first predetermined pressure.

12. The leak diagnostic method of claim 11 wherein said vehicle is a plug-in hybrid vehicle.

13. The leak diagnostic method of claim 11 further comprising selectively disabling said selectively diagnosing said leak when said first fuel tank pressure is greater than said first predetermined pressure.

14. The leak diagnostic method of claim 11 further comprising determining that said fuel vapor purge valve and a vent valve are in closed positions before said outputting said first and second fuel tank pressures.

15. The leak diagnostic method of claim 11 wherein said selectively diagnosing said leak comprises diagnosing said leak when said second fuel tank pressure is greater than a second predetermined pressure that is greater than said first predetermined pressure.

16. The leak diagnostic method of claim 15 wherein said second predetermined pressure is based on said predetermined engine vacuum.

17. The leak diagnostic method of claim 11 further comprising:

selectively determining a pressure offset based on a difference between said first fuel tank pressure and said first predetermined pressure; and subtracting said pressure offset from said second fuel tank pressure before said selectively outputting said second fuel tank pressure.

18. The leak diagnostic method of claim 17 wherein said selectively determining comprises determining said pressure offset when said first fuel tank pressure is less than said first predetermined pressure.

19. The leak diagnostic method of claim 11 wherein said selectively outputting said first fuel tank pressure comprises outputting said first fuel tank pressure a predetermined period after said engine is shut down.

20. The leak diagnostic method of claim 19 wherein said predetermined period based on an expected period when a vacuum forms within a fuel tank after said engine is shut down.

* * * * *